(12) United States Patent
Fujimori et al.

(10) Patent No.: US 6,225,762 B1
(45) Date of Patent: May 1, 2001

(54) METHOD AND APPARATUS FOR PROVIDING MOIRÉ EFFECT CORRECTION ON A MULTI-SCAN DISPLAY MONITOR

(75) Inventors: Shin Fujimori; Taro Tadano, both of San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/165,172

(22) Filed: Oct. 1, 1998

(51) Int. Cl.[7] ........................................ G09G 1/04
(52) U.S. Cl. ................................ 315/370; 315/368.17
(58) Field of Search ............................ 315/370, 371, 315/368.17, 382.1; 348/806, 189

(56) References Cited

U.S. PATENT DOCUMENTS

| | | |
|---|---|---|
| 4,887,010 | 12/1989 | Fujimura . |
| 5,107,188 | 4/1992 | Rindal . |
| 5,315,310 | 5/1994 | Eagle et al. . |
| 5,430,502 | 7/1995 | Yamazaki et al. . |
| 5,440,353 | 8/1995 | Yamazaki et al. . |
| 5,672,939 | 9/1997 | Hsiesh . |
| 5,767,632 | 6/1998 | Yoshida et al. . |
| 5,777,441 * | 7/1998 | Yoshida et al. ................... 315/371 |
| 5,777,698 | 7/1998 | Park . |
| 5,923,173 * | 7/1999 | Yu ................................... 324/547 |
| 5,929,574 * | 7/1999 | Kim et al. ......................... 315/370 |
| 5,959,414 * | 9/1999 | Yoshida et al. ................... 315/382 |
| 6,094,018 * | 7/2000 | Fujimori et al. .................. 315/370 |

FOREIGN PATENT DOCUMENTS 63-275284   11/1988 (JP) .
6-121195     4/1994 (JP) .

* cited by examiner

Primary Examiner—Seungsook Ham
Assistant Examiner—Shun Lee
(74) Attorney, Agent, or Firm—Blakely, Sokoloff, Taylor & Zafman LLP

(57) ABSTRACT

A moiré adjustment circuit receives a horizontal synchronization signal having a horizontal scanning frequency and a moiré adjustment signal substantially proportional to a horizontal spatial offset of alternate display lines on the display to correct the moiré effect. The moiré adjustment circuit generates a horizontal position signal having a first frequency proportional to the horizontal scanning frequency and a position value substantially proportional to the moiré adjustment signal and the horizontal scanning frequency. A horizontal position control circuit, coupled to the moiré adjustment circuit, generates a horizontal reference signal having a second frequency substantially equal to the horizontal scanning frequency and a reference phase that is shifted from a synchronization phase of the horizontal synchronization signal substantially in proportion to the horizontal position signal. A horizontal driver circuit, coupled to the horizontal position control circuit, generates a flyback pulse having a third frequency substantially equal to the horizontal scanning frequency and a flyback phase that is substantially equal to the reference phase. The flyback phase controls a horizontal position of lines on the display to correct the moiré effect.

18 Claims, 3 Drawing Sheets

METHOD AND APPARATUS FOR PROVIDING MOIRÉ EFFECT CORRECTION ON A MULTI-SCAN DISPLAY MONITOR

BACKGROUND OF THE INVENTION

1. Field of the Invention

The present invention relates to a method and apparatus for correcting the moiré effect on a multi-scan display monitor.

2. Background Information

Color cathode ray tubes (CRTs) are commonly used as visual display devices, employing up to three electrodes, typically one for each primary color: red, green, and blue. Most color CRTs use a shadow mask to selectively illuminate a matrix of each electrode's respective colored phosphors (i.e., red, green, and blue). The beam is typically larger than the shadow mask opening size, so the shadow mask blocks part of the beam and casts a portion of the original beam onto the desired phosphor. The dot pitch, or spacing, between adjacent shadow mask openings is typically between 0.2 and 0.3 mm to achieve a high resolution display.

A video pattern displayed on the CRT is comprised of a array of pixels, typically 640 to 1280 pixels wide and 480 to 1024 pixels high. One pixel will typically illuminate several screen dots. The number of screen dots illuminated is inversely proportional to the resolution of the video pattern. At higher video resolutions the number of screen dots illuminated can be less than three. At these higher resolutions an interference pattern, typically termed the moiré effect, can appear. From an operating standpoint, the moiré interference phenomenon poses a serious aesthetic problem, since the best electron beam focus and the highest image resolution results in generating an unacceptably noticeable moiré effect if the video signal being displayed includes alternating pixel patterns, which is a common occurrence.

One method of correcting the moiré effect is to rapidly shift the position of the image a small distance. The moiré patterns rapidly change in response to the shifting position and, because of persistence of vision, become unnoticeable. The required shift in position is small, typically about one-half of the screen dot pitch, and is imperceptible when the screen is viewed. One method of position shifting moiré cancellation is to shift all the lines of the display horizontally in every other display frame. Another method of position shifting moiré cancellation is to shift every other line of the display horizontally.

The disclosed methods add additional circuitry to the display monitor to produce the shifting of the image, increasing the cost and complexity of the display monitor. What is needed is a method and apparatus for correcting the moiré effect that reduces or eliminates the need for additional circuitry in the display monitor and which is suitable for use in display monitors which operate with a plurality of scanning resolutions and frequencies.

SUMMARY OF THE INVENTION

The present invention provides a method for correcting the moiré effect on a multi-scan display monitor with compensation for changes in the horizontal scanning frequency. A moiré adjustment signal is received which is substantially proportional to a desired horizontal spatial offset of alternate display lines on the CRT display. The horizontal spatial offset provides for the cancellation of the moiré pattern. A horizontal position signal is generated with a first frequency proportional to the horizontal scanning frequency and a position value substantially proportional to the moiré adjustment signal and the horizontal scanning frequency. A horizontal driver circuit generates a flyback pulse having a second frequency substantially equal to the horizontal scanning frequency and a phase that is shifted from a phase of the horizontal synchronization signal substantially in proportion to the horizontal position signal. The flyback pulse controls the position of lines on the display to correct the moiré effect. The increase in the moiré adjustment signal in proportion to the horizontal scanning frequency compensates for the lag of the horizontal driver circuit in responding to high frequency changes in the horizontal position signal.

DETAILED DESCRIPTION OF THE INVENTION

A method for correcting the moiré effect on a CRT display monitor by shifting alternating display lines that adds little or no circuitry to the display monitor and compensates for changes in the horizontal scanning frequency is disclosed.

Figure 1:
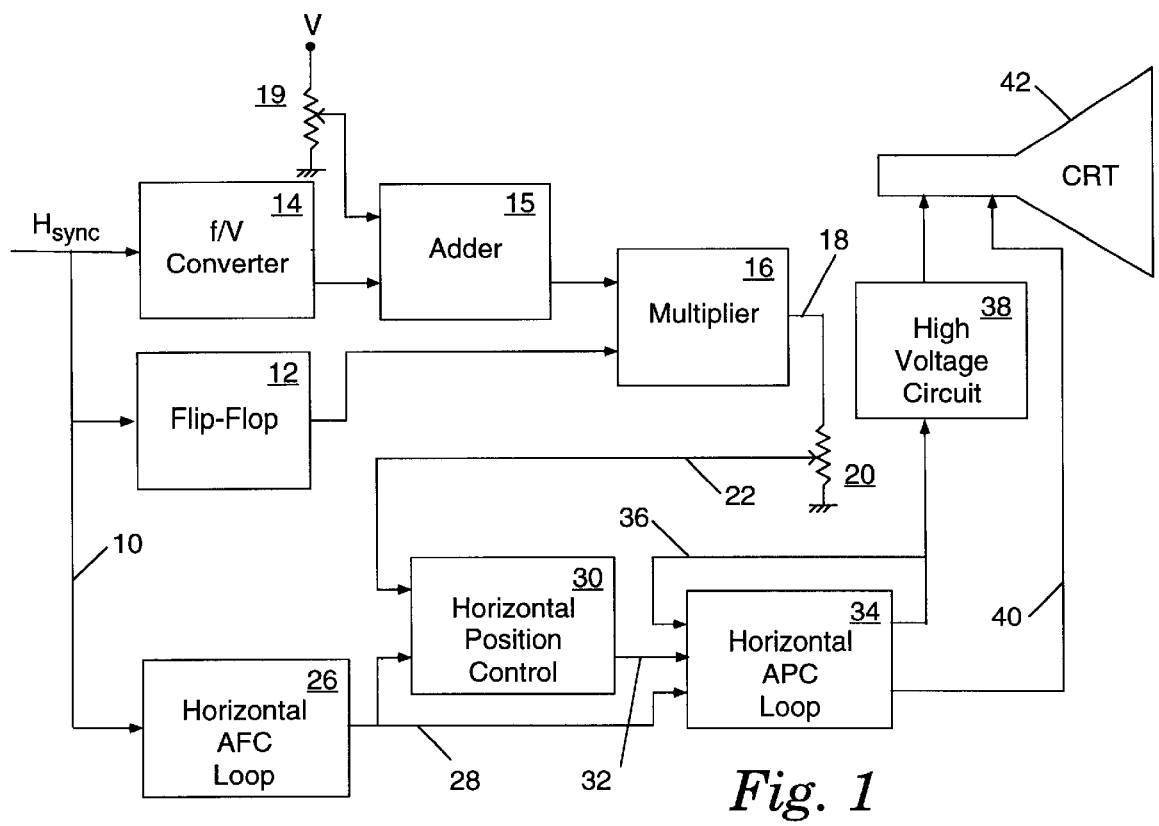
FIG. 1 illustrates one embodiment of a moiré correction circuit of the present invention.

FIG. 1 illustrates a display system that implements the moiré correction technique of the present invention. A typical CRT display monitor includes a horizontal synchronization circuit which controls horizontal position of the displayed image. The horizontal synchronization circuit of the CRT display shown in FIG. 1 includes a horizontal automatic frequency control (AFC) loop 26, a horizontal position control 30, and a horizontal driver circuit, also termed a horizontal APC loop 34. The horizontal synchronization circuit receives a horizontal synchronization signal ($H_{sync}$) 10 and generates a horizontal sweep signal 40 that is applied to the CRT deflection circuits and a flyback pulse 36 that is applied to a high voltage circuit to generate high voltage current for the CRT 42. The phase shift between $H_{sync}$ 10 and the flyback pulse 36 controls the horizontal position of the displayed image.

Figure 2:
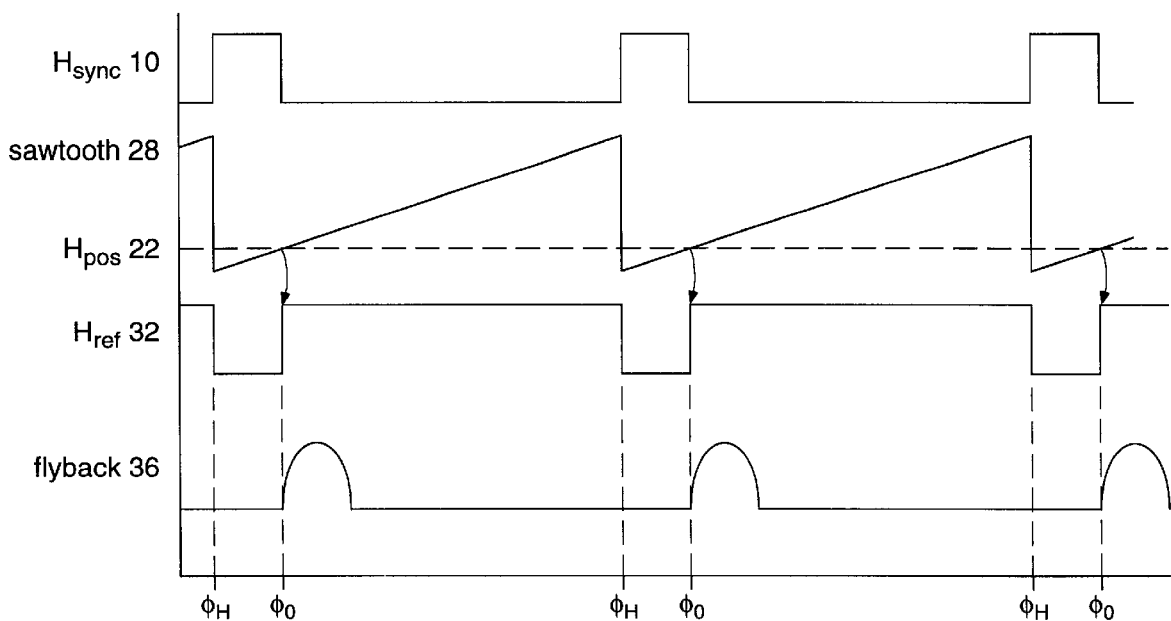
FIG. 2 illustrates waveforms generated in a horizontal synchronization circuit prior to the application of the invention.

The AFC loop 26 receives $H_{sync}$ 10 and generates a sawtooth waveform 28 of the same frequency as $H_{sync}$ 10. FIG. 2 represents these waveforms, prior to the implementation of the invention. The horizontal position control circuit 30 receives the sawtooth waveform 28 and a horizontal position signal ($H_{pos}$) 22, shown by the dashed level superimposed on the sawtooth waveform 28 in FIG. 2, and generates a horizontal reference signal ($H_{ref}$) 32 of the same frequency as $H_{sync}$ 10 with an edge that is phase shifted from $H_{sync}$ 10 responsive to $H_{pos}$ 22. The phase shifted edge controls the horizontal position of the displayed image. The image will move to the right as the difference in phase between $H_{sync}$ 10 and $H_{ref}$ 32, $\phi_0 - \phi_H$, increases.

Figure 3:
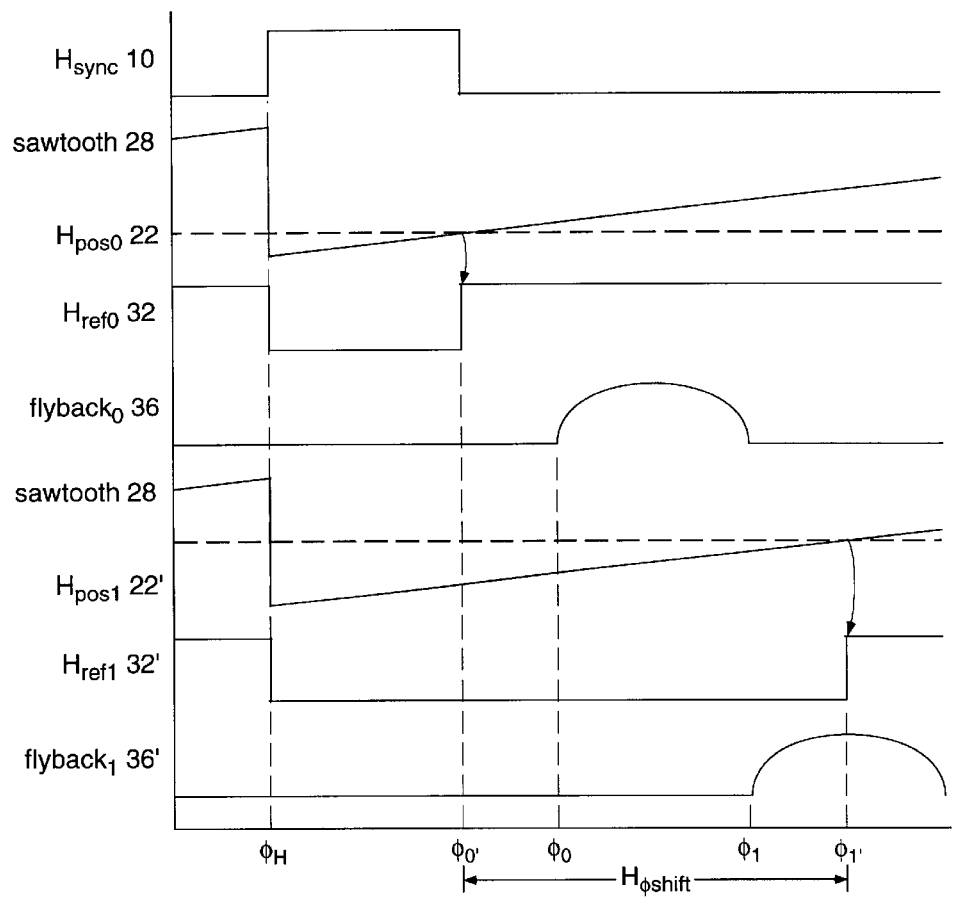
FIG. 3 illustrates waveforms in one embodiment of a moiré correction circuit of the present invention.

In one embodiment of the invention, a moiré canceling signal with a frequency of one-half the frequency of $H_{sync}$ 10 is generated by a flip-flop 12 and a variable resistor 20. The moiré canceling signal is applied to $H_{pos}$ 22 to cause a small phase shift in $H_{ref}$ 32 on every other cycle. This is illustrated in FIG. 3, which shows the signals for the time from the leading edge of $H_{sync}$ 10 to the leading edge of the flyback pulse 36. In one cycle, the output of the flip-flop 12 is zero and there is no additional phase shift of $H_{ref0}$ 32. $H_{pos0}$, $H_{ref0}$ and flyback$_0$ illustrate an unshifted cycle. In the following cycle, the output of the flip-flop 12 is one and there is an additional phase shift $H_{\phi shift}$ of $H_{ref1}$ 32'. $H_{pos1}$, $H_{ref1}$ and flyback$_1$ illustrate a shifted cycle. The phase shift between $H_{ref1}$ 32' and $H_{ref0}$ 32, $H_{\phi shift}=\phi_{0'}-\phi_{1'}$, represents the desired horizontal shift in position between two consecutive display lines for the purpose of correcting the moiré effect.

The horizontal APC loop 34 generates the flyback pulse 36 which tracks the phase of $H_{ref}$ 32. The APC loop 34 receives the sawtooth waveform 28 and generates the flyback pulse 36 that is applied to a high voltage circuit to generate high voltage current for the CRT 42 and a horizontal sweep signal 40 that is applied to the CRT deflection circuits. The APC loop 34 compares the phase of the generated flyback pulse 36 to the phase of $H_{ref}$ 32 in a feedback circuit that adjusts the phase of the generated flyback pulse 36 to track the phase of $H_{ref}$ 32.

Figure 4:
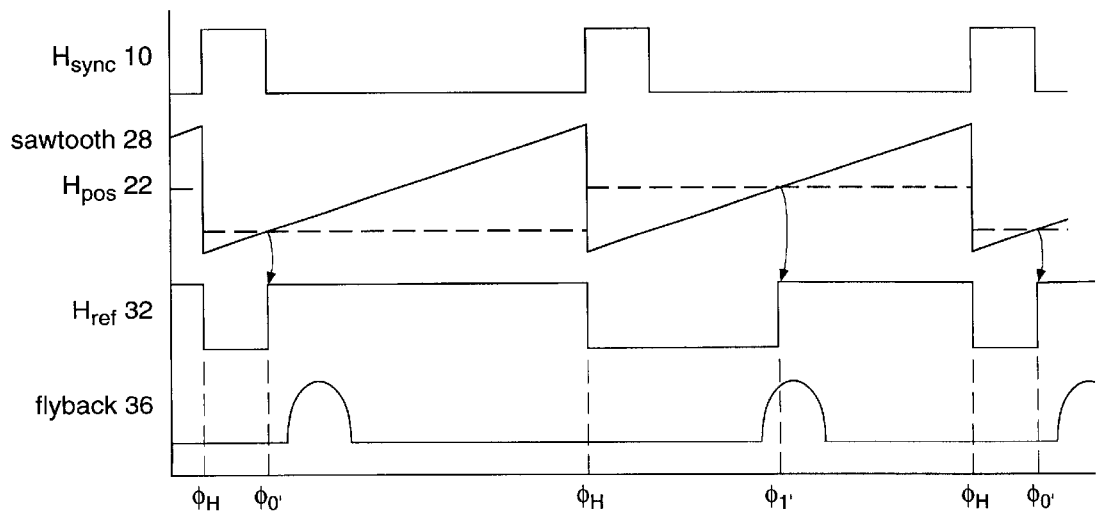
FIG. 4 illustrates another view of certain waveforms in one embodiment of a moiré correction circuit of the present invention.

The phase of the flyback pulse 36 does not equal the phase of $H_{ref}$ 32, as shown in FIG. 3, because the time constant of the feedback loop of the horizontal APC loop 34 prevents the phase of the flyback pulse 36 from being changed to fully match a change in the phase of $H_{ref}$ 32 in the time of one cycle. This is illustrated in FIG. 3 by the phase shift between $\phi_0$ and $\phi_{0'}$ and between $\phi_1$ and $\phi_{1'}$. In one cycle time, the phase of the flyback pulse 36 will only change by a fraction of the amount that the phase of $H_{ref}$ 32 changes. The moiré canceling signal applied to $H_{pos}$ 22 is therefore increased by an amount that is proportional to the horizontal scanning frequency to produce an additional phase shift in $H_{ref}$ 32 to compensate for the lag of the horizontal APC loop 34 in responding to changes in the phase of $H_{ref}$ 32. FIG. 4 shows the alternating value of $H_{pos}$ 22, the changing phase of $H_{ref}$ 32, and the lagging flyback pulses 36. It will be understood that the magnitude of the shifts illustrated in FIGS. 3 and 4 have been exaggerated to clearly show the relationships of the signals.

As discussed earlier, FIG. 1 illustrates one embodiment of the invention. A trim resistor 19 produces a first voltage a sufficient to shift a horizontal display line a distance that corrects the moiré effect under worst case conditions assuming that the phase of the flyback pulse 36 accurately tracks $H_{ref}$ 32. A frequency to voltage converter 14 produces a voltage signal $b_{fH}$ that is substantially proportional to the horizontal scanning frequency. An adder 15 adds the first voltage signal to the second voltage signal to produce a voltage value $a+bf_H$ sufficient to shift a horizontal display line a distance that corrects the moiré effect under worst case conditions compensating for the lag of the horizontal APC loop 34 when the phase of $H_{ref}$ 32 is changing at the horizontal scanning frequency.

Flip-flop 12 receives $H_{sync}$ 10 and produces an output signal with one-half the horizontal synchronization frequency. The output of the adder 15 is multiplied by the output of the flip-flop 12 by multiplier 16 to produce a moiré adjustment signal 18 with an amplitude substantially proportional to $a+bf_H$ and a frequency of one-half the scanning frequency. In one embodiment of the invention, the moiré adjustment signal 18 is the maximum signal applied to $H_{pos}$ 22. The moiré adjustment signal 18 is supplied to moiré adjustment control 20. Moiré adjustment control 20 can be adjusted to provide a value for $H_{pos}$ 22 that has an amplitude proportional to $a+bf_H$. This allows the phase shift of the flyback pulse 36 to be adjusted substantially independently of the frequency of $H_{pos}$ 22.

Figure 5:
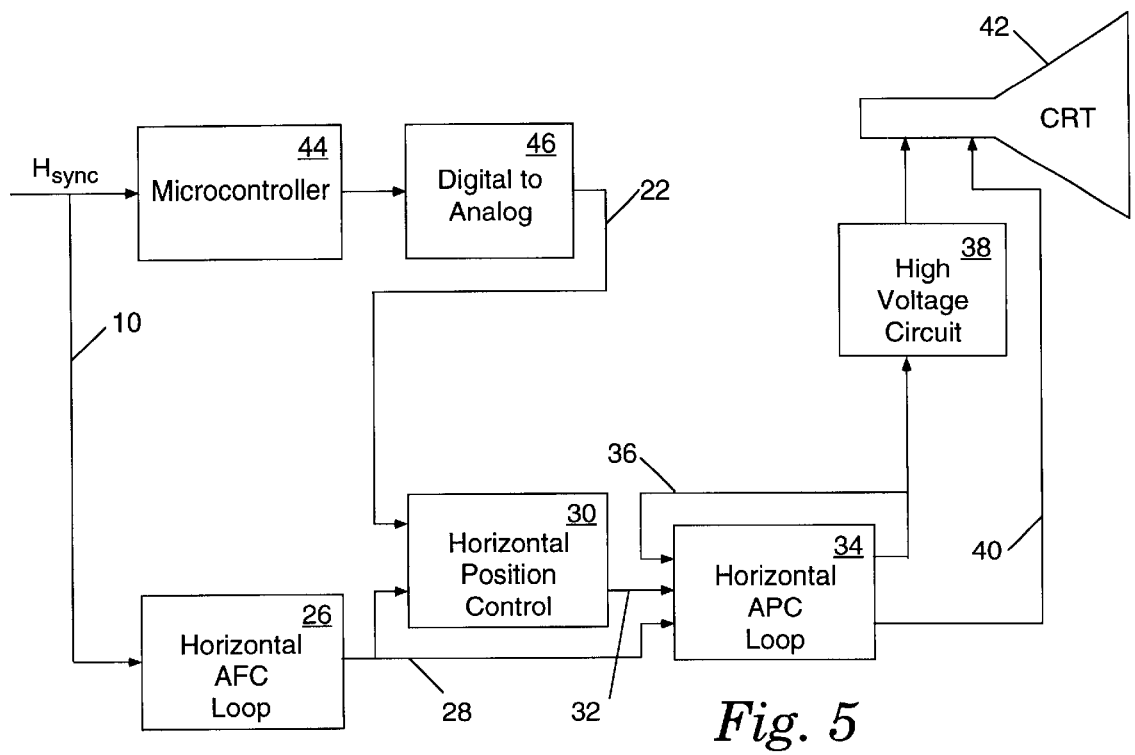
FIG. 5 illustrates a second embodiment of a moiré correction circuit of the present invention.

FIG. 5 illustrates another embodiment of the invention. In this embodiment, the moiré adjustment control comprises digital inputs that are sensed by microcontroller 44 and stored as a digital value M. The microcontroller 44 senses $H_{sync}$ 10 and produces a digital value that is substantially proportional to the horizontal scanning frequency. The microcontroller 44 generates a sequence of digital values that alternate between 0 and a value that is substantially proportional to $M(a+bf_h)$ at a frequency of one-half the horizontal scanning frequency. The sequence of digital values are transmitted to a digital to analog converter 46 to generate $H_{pos}$ 22 such that alternating horizontal lines of the display are shifted horizontally responsive to the setting of the moiré adjustment control value. In another embodiment of the invention, the microcontroller 44 also senses a vertical synchronization signal and generates a sequence of digital values such that lines that are shifted during one vertical frame are not shifted during a following vertical frame and lines that are not shifted during the one vertical frame are shifted during the following vertical frame.

Figure 6:
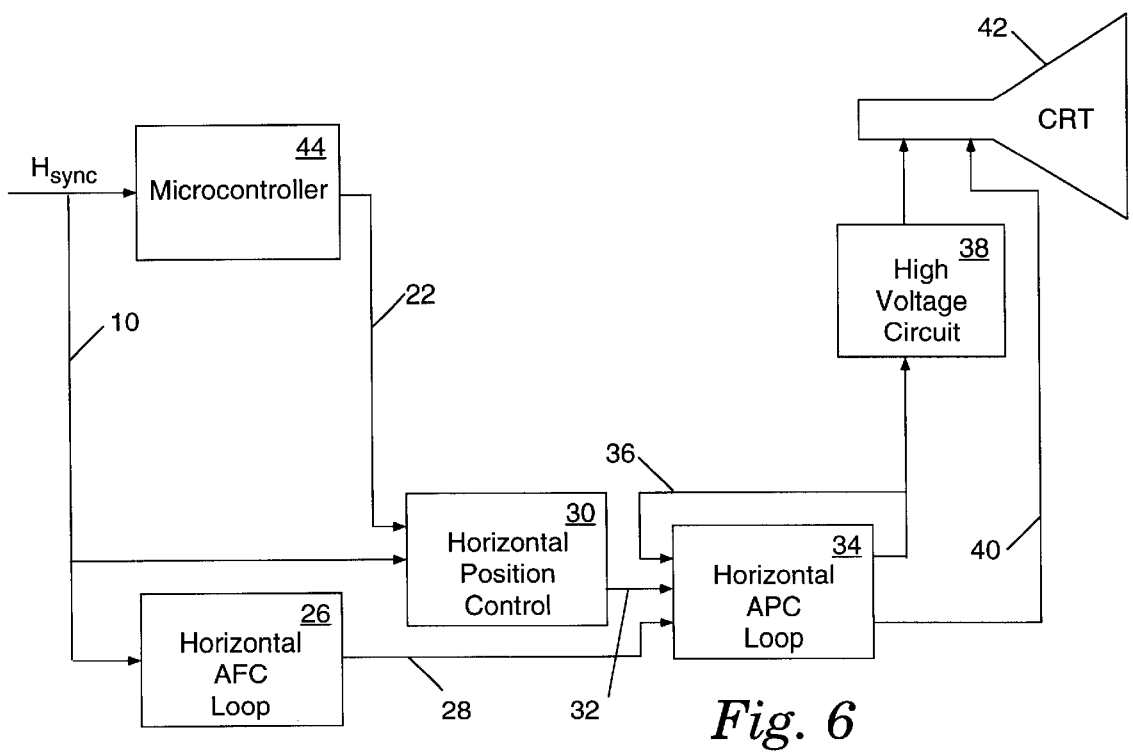
FIG. 6 illustrates a third embodiment of a moiré correction circuit of the present invention.

In another embodiment of the invention illustrated in FIG. 6, the horizontal position control circuit 30 is implemented as a digital circuit. The horizontal position control circuit 30 receives $H_{pos}$ 22 as a digital value and $H_{sync}$ 10. The horizontal position control circuit 30 generates $H_{ref}$ 32 by creating a timed delay from the leading edge of $H_{sync}$ 10 to the phase shifted edge of $H_{ref}$ 32, based on the value of $H_{pos}$ 22.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A circuit for correcting a moiré effect on a display, comprising:

a moiré adjustment circuit to receive a horizontal synchronization signal having a horizontal scanning frequency and a moiré adjustment signal substantially proportional to a horizontal spatial offset of alternate display lines on the display to correct the moiré effect, the moiré adjustment circuit generating a horizontal position signal having a first frequency proportional to the horizontal scanning frequency and a position value substantially proportional to the moiré adjustment signal and the horizontal scanning frequency;

a horizontal position control circuit, coupled to the moiré adjustment circuit, that generates a horizontal reference signal having a second frequency substantially equal to the horizontal scanning frequency and a reference phase that is shifted from a synchronization phase of the horizontal synchronization signal substantially in proportion to the horizontal position signal; and a horizontal driver circuit, coupled to the horizontal position control circuit, that generates a flyback pulse having a third frequency substantially equal to the horizontal scanning frequency and a flyback phase that is substantially equal to the reference phase, the flyback phase controlling a horizontal position of lines on the display to correct the moiré effect.

2. The circuit of claim 1, wherein the first frequency is one-half the horizontal scanning frequency.

3. The circuit of claim 1, wherein the position value is substantially proportional to the moiré adjustment signal multiplied by a quantity comprised of the horizontal scanning frequency plus a constant.

4. The circuit of claim 1, wherein the moiré adjustment circuit further comprises receiving a horizontal adjustment value and generating the horizontal position signal further comprises adding the horizontal adjustment value.

5. The circuit of claim 1, wherein the moiré adjustment circuit further receives a vertical synchronization signal and adjusts the horizontal position signal when the vertical synchronization signal is received so that display lines that were not shifted prior to receiving the vertical synchronization signal are shifted and display lines that were shifted prior to receiving the vertical synchronization signal are not shifted.

6. The circuit of claim 1, wherein the moiré adjustment circuit is comprised of a microcontroller.

7. A cathode ray tube display system for receiving and displaying a video signal comprising a horizontal synchronization signal, the cathode ray tube display system comprising:

a moiré adjustment circuit that receives the horizontal synchronization signal, having a horizontal scanning frequency, receives a moiré adjustment signal substantially proportional to a spatial offset of alternate display lines to correct a moiré effect, and generates a horizontal position signal having a first frequency proportional to the horizontal scanning frequency and a position value substantially proportional to the moiré adjustment signal and the horizontal scanning frequency;

a horizontal position control circuit that receives the horizontal position signal, that receives the horizontal synchronization signal, and that generates a horizontal reference signal having a second frequency substantially equal to the horizontal scanning frequency and a reference phase that is shifted from the synchronization phase of the horizontal synchronization signal substantially in proportion to the horizontal position signal;

a horizontal driver circuit that receives the horizontal reference signal and that generates a flyback pulse having a third frequency substantially equal to the horizontal scanning frequency and a flyback phase that is substantially equal to the reference phase; and a display that receives the video signal, for display, and receives the flyback phase controlling a horizontal position of lines on the display to correct the moiré effect.

8. The cathode ray tube display system of claim 7, wherein the first frequency is one-half the horizontal scanning frequency.

9. The cathode ray tube display system of claim 7, wherein the position value is substantially proportional to the moiré adjustment signal multiplied by a quantity comprised of the horizontal scanning frequency plus a constant.

10. The cathode ray tube display system of claim 7, wherein the moiré adjustment circuit further receives a horizontal adjustment signal and generates the horizontal position signal having the position value substantially proportional to the horizontal adjustment signal, the moiré adjustment signal, and the horizontal scanning frequency.

11. The cathode ray tube display system of claim 7, wherein the moiré adjustment circuit further receives a vertical synchronization signal and adjusts the horizontal position signal when the vertical synchronization signal is received so that display lines that were not shifted prior to receiving the vertical synchronization signal are shifted and display lines that were shifted prior to receiving the vertical synchronization signal are not shifted.

12. The cathode ray tube display system of claim 7, wherein the moiré adjustment circuit is comprised of a microcontroller.

13. A method of correcting a moiré effect on a display comprising:

receiving a horizontal synchronization signal having a horizontal scanning frequency;

receiving a moiré adjustment signal substantially proportional to a horizontal spatial offset of alternate display lines on the display to correct the moiré effect;

generating a horizontal position signal having a first frequency proportional to the horizontal scanning frequency and a position value substantially proportional to the moiré adjustment signal and the horizontal scanning frequency;

generating a horizontal reference signal having a second frequency substantially equal to the horizontal scanning frequency and a reference phase that is shifted from the synchronization phase of the horizontal synchronization signal substantially in proportion to the horizontal position signal;

generating a flyback pulse having a third frequency substantially equal to the horizontal scanning frequency and a flyback phase that is substantially equal to the reference phase; and providing the flyback pulse to the display, the flyback phase controlling a horizontal position of lines on the display and correcting the moiré effect.

14. The method of claim 13, wherein the first frequency is one-half the horizontal scanning frequency.

15. The method of claim 13, wherein the position value is substantially proportional to the moiré adjustment signal multiplied by a quantity comprised of the horizontal scanning frequency plus a constant.

16. The method of claim 15, further comprising receiving a horizontal adjustment value and generating the position value substantially proportional to the horizontal adjustment value added to a quantity comprised of the moiré adjustment signal multiplied by the horizontal scanning frequency.

17. The method of claim 13, further comprising receiving a vertical synchronization signal and adjusting the horizontal position signal when the vertical synchronization signal is received so that display lines that were not shifted prior to receiving the vertical synchronization signal are shifted and display lines that were shifted prior to receiving the vertical synchronization signal are not shifted.

18. The method of claim 13, wherein the horizontal position signal is generated by a microcontroller.

\* \* \* \* \*